United States Patent
Chisholm et al.

(10) Patent No.: US 10,184,469 B2
(45) Date of Patent: Jan. 22, 2019

(54) SAFETY CLOSURES AND PUMPING SYSTEMS

(71) Applicants: Dean Chisholm, Turner Valley (CA); Lee A. Krywitsky, Calgary (CA)

(72) Inventors: Dean Chisholm, Turner Valley (CA); Lee A. Krywitsky, Calgary (CA)

(*) Notice: Subject to any disclaimer, the term of this patent is extended or adjusted under 35 U.S.C. 154(b) by 584 days.

(21) Appl. No.: 14/577,453

(22) Filed: Dec. 19, 2014

(65) Prior Publication Data
US 2015/0184784 A1 Jul. 2, 2015

Related U.S. Application Data

(60) Provisional application No. 61/921,285, filed on Dec. 27, 2013.

(51) Int. Cl.
| | | |
|---|---|---|
| *F04B 53/16* | (2006.01) | |
| *F04B 9/14* | (2006.01) | |
| *F04B 17/06* | (2006.01) | |
| *F16L 55/115* | (2006.01) | |
| *F04B 53/22* | (2006.01) | |

(Continued)

(52) U.S. Cl.
CPC ............... *F04B 53/16* (2013.01); *F04B 9/14* (2013.01); *F04B 17/06* (2013.01); *F04B 53/22* (2013.01);
(Continued)

(58) Field of Classification Search
CPC ......... F16L 33/00; F16L 37/07; F16L 37/113; F16L 37/248; F16L 37/086; F16L 37/121;
(Continued)

(56) References Cited

U.S. PATENT DOCUMENTS 620,821 A * 3/1899 Abbey et al. ......... F16L 37/252
285/349
796,220 A * 8/1905 Jones .................... F16L 37/252
285/317
(Continued)

FOREIGN PATENT DOCUMENTS

CA 2085556 6/1993
CA 2733240 3/2010
(Continued)

OTHER PUBLICATIONS

International Search Report and Written Opinion for PCT/IB2014/003275 dated Dec. 2, 2015.
(Continued)

*Primary Examiner* — Kenneth J Hansen
(74) *Attorney, Agent, or Firm* — Workman Nydegger

(57) ABSTRACT

A safety enclosure includes an adaptor arranged to attach to a cartridge or product barrel of a pumping system. The adaptor defines an axial bore and an outer radial surface. The outer radial surface defines a first plurality of radial ridges and a plurality of gaps extending in an axial direction between groupings of the first radial ridges. A cap includes a radial inner surface defining a receiving space and a second plurality of radial ridges. The receiving space is arranged to receive an upper portion of the adaptor and the second radial ridges are arranged to selectively mate with and engage the first radial ridges of the adaptor. A locking system includes a locking arm movably attached to the cap and including a lock piece arranged to selectively protrude into the receiving space to lock the first radial ridges in engagement with the second radial ridges.

20 Claims, 11 Drawing Sheets

(51) Int. Cl.
*F16J 13/12* (2006.01)
*F16J 13/24* (2006.01)

(52) U.S. Cl.
CPC .............. *F16J 13/12* (2013.01); *F16J 13/24* (2013.01); *F16L 55/1155* (2013.01)

(58) Field of Classification Search
CPC ... F16L 37/1215; F16L 37/091; F16L 37/105; F16L 37/082; F16L 37/0844; F16L 37/0848; F16L 37/096; F16L 37/1205; F16L 37/122; Y10T 403/589; Y10T 403/599; Y10T 403/602; Y10T 292/03; F04B 17/06; F04B 53/16; F04B 53/22; B65D 45/34; B65D 45/32; B65D 45/22; B65D 45/16; B65D 45/00; B65D 43/22
USPC .................. 411/315–318, 209–211; 285/92, 285/209–211, 314, 315–318, 391
See application file for complete search history.

(56) References Cited

U.S. PATENT DOCUMENTS

| | | | | |
|---|---|---|---|---|
| 2,952,482 A | * | 9/1960 | Torres | F16L 37/121 285/1 |
| 3,666,297 A | * | 5/1972 | Marks | F16L 19/0218 285/323 |
| 3,922,009 A | * | 11/1975 | Giebeler | E21B 17/08 285/376 |
| 5,823,406 A | * | 10/1998 | Roberts | F04B 49/14 141/104 |
| 2006/0202475 A1 | | 9/2006 | Gunderson | |
| 2007/0257486 A1 | * | 11/2007 | Filippov | E21B 43/106 285/382.2 |
| 2008/0281284 A1 | | 11/2008 | Garfield et al. | |
| 2009/0249569 A1 | | 10/2009 | Schouten | |
| 2012/0286498 A1 | * | 11/2012 | Baldemor | B62B 1/002 280/651 |

FOREIGN PATENT DOCUMENTS

| | | |
|---|---|---|
| CN | 2584801 | 11/2003 |
| CN | 102138003 | 7/2011 |
| CN | 102518889 | 6/2012 |
| WO | 2015159119 | 10/2015 |

OTHER PUBLICATIONS

First Office Action in Chinese application No. 2014800765336 dated May 2, 2017, pp. 1-21.

* cited by examiner

SAFETY CLOSURES AND PUMPING SYSTEMS

CROSS-REFERENCE TO RELATED APPLICATIONS

This application claims the benefit of, and priority to, U.S. provisional patent application 61/921,285, entitled "Safety Closures, Pumping Systems, and Methods of Use," filed Dec. 27, 2013, which is incorporated herein in its entirety by this reference.

BACKGROUND

A typical portable pumping system includes a piston or pump that forces products lubricants, sealants, etc.) through a high pressure hose and fittings. The product is fed to the hose and fittings from an attached barrel containing bulk product or cartridges containing the same. A closure or cap is normally threaded on the product barrel that can be selectively removed to provide access to the interior of the product barrel. This general type of system is used in a number of industries. For example, for the servicing and maintenance of valves, a user unthreads the closure from the product barrel of the pumping system and drops a grease cartridge or stick of grease into the product barrel. The user then rethreads the closure onto the product barrel. With the closure tightly threaded on the product barrel, the pump or piston of the system is actuated to compress the grease through the high pressure hose and fittings. When servicing a valve, at least one of the fittings can be mechanically attached to the valve and the grease can be introduced from the high pressure hose and fitting into the valve to cause the valve to remain lubricious or to stop a leak.

Unfortunately, such a pumping system tends to suffer from a number of drawbacks. For example, threading and unthreading the closure from the product barrel normally requires two hands and can be time consuming and labor intensive. One will appreciate that the connection and removal of the closure from the product barrel can be particularly difficult and cumbersome when the user's hands are greasy. Indeed, due to the difficultly of threading on the closure, the closure can be easily dropped or otherwise damaged during installation. Additionally, the threaded connection between the product barrel and the conventional closure can tend to back out or unthread in response to the buildup of pressure within the system. Further, with a conventional closure, there can be a violent decompression of the pumping system when the closure is unthreaded from the product barrel. In the case of systems operating at higher pressures, this can be particularly dangerous or evenly deadly for an operator.

Accordingly, manufacturers and users of portable pumping systems continue to seek closure and portable pumping system designs that are quicker, safer, and more convenient.

SUMMARY

The disclosure describes various embodiments of a safely closure providing a construction and design including a rapid engagement and locking system that allows the safety closure to be ergonomically, quickly and safely connected to and disconnected from a product barrel or cartridge of a pumping or injection system. Moreover, a cap of the safety closure can be ergonomically removed and unlocked from the safety closure in a single step. As such, one or more embodiments of the present disclosure reduce the likelihood of operator injuries and can be more efficiently utilized in the field.

In particular, some embodiments of the present disclosure include a safety enclosure having an adaptor arranged to attach to a cartridge or product barrel of a pumping system. The adaptor defines an axial bore and an outer radial surface. The outer radial surface defines a first plurality of radial ridges and a plurality of gaps extending in an axial direction between groupings of the first radial ridges.

A cap includes a radial inner surface defining a receiving space and a second plurality of radial ridges. The receiving space is arranged to receive an upper portion of the adaptor and the second radial ridges are arranged to selectively mate with and engage the first radial ridges of the adaptor. A locking system includes a locking arm movably attached to the cap and including a lock piece arranged to selectively protrude into the receiving space to lock the first radial ridges in engagement with the second radial ridges.

In an embodiment, the locking arm includes an ergonomic, arcuate shape that allows the cap to be unlocked from the adaptor and removed therefrom in a single step or motion by a user.

Additional features and advantages of the disclosure will be set forth in the description which follows, and in part will be obvious from the description, or may be learned by the practice of the invention. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

These and other features, aspects, and advantages of the present disclosure will become better understood regarding the following description, appended claims, and accompanying drawings.

DETAILED DESCRIPTION OF VARIOUS EMBODIMENTS

Figure 1:
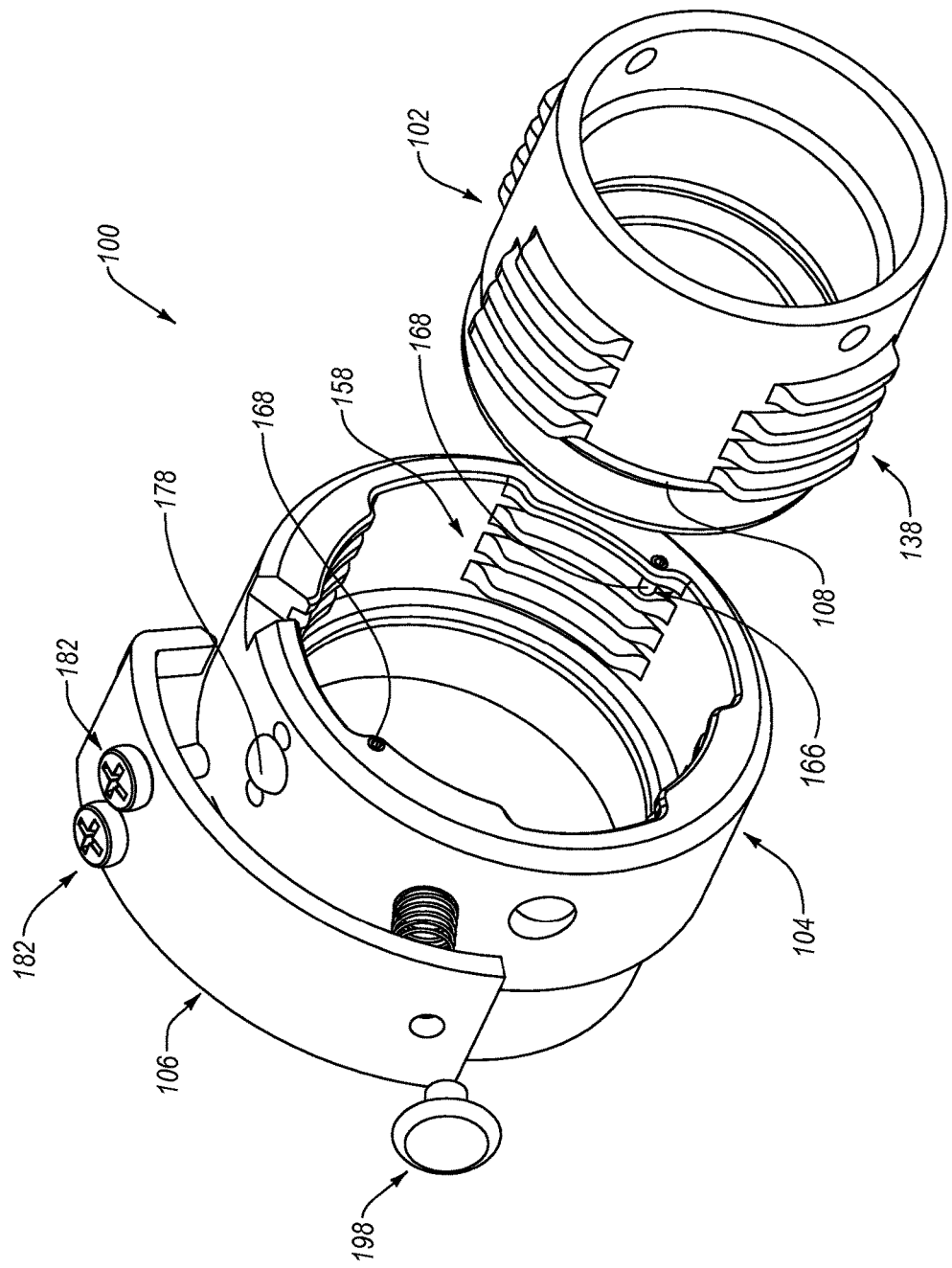
FIG. 1 is an exploded view of a safety closure according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and described below. It should be understood, however, there is no intention to limit the disclosure to the embodiments disclosed, but on the contrary, that the intention covers all modifications, alternative constructions, combinations, and equivalents falling with the spirit and scope of the disclosure.

The exemplary embodiments of the safety closures are generally described being used with a conventional product barrel of a portable pumping system, however, it will be appreciated that the safety closures can be used in a number of different applications including but not limited to, injection systems and cartridges containing grease, sealant, and/or other products.

Figure 2:
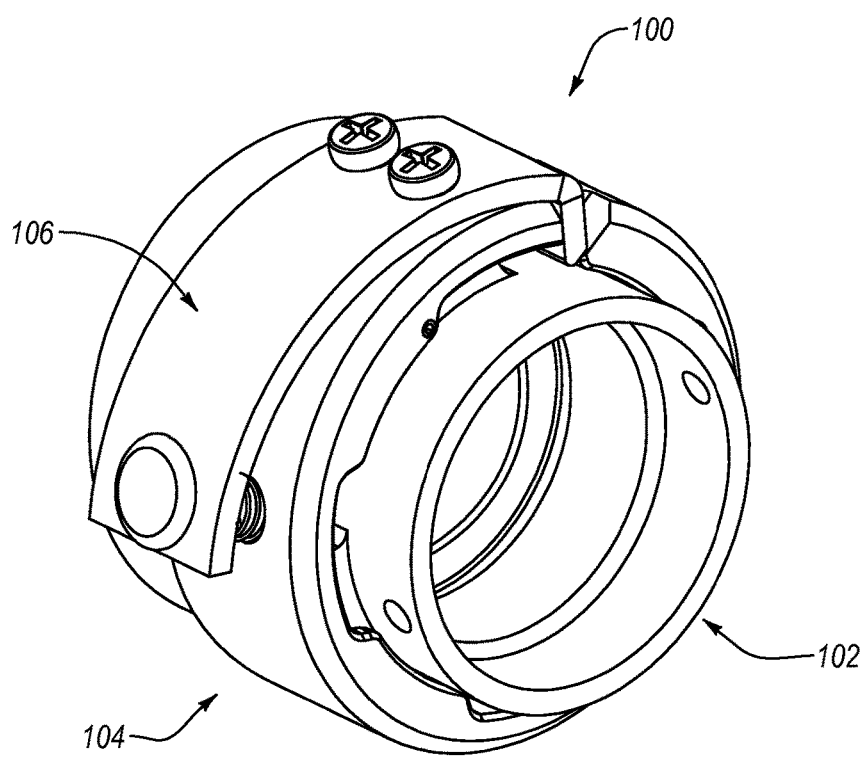
FIG. 2 is an isometric view of the safety closure shown in FIG. 1 in assembled form.

With reference to FIGS. 1 and 2, an exemplary embodiment of a safety closure 100 comprises an adaptor 102, a cap 104, a locking system 106, and at least one sealing member 108. The safety closure 100 exhibits a two-piece construction allowing the safety closure 100 to be safely and quickly installed on and/or disconnected from a conventional product barrel of a portable pumping system. The product barrel can carry grease, sealant, and/or any other suitable product and/or cartridges carrying the same. The safely closure 100 can also be easily retrofitted to conventional product barrels as necessary.

Figure 3:
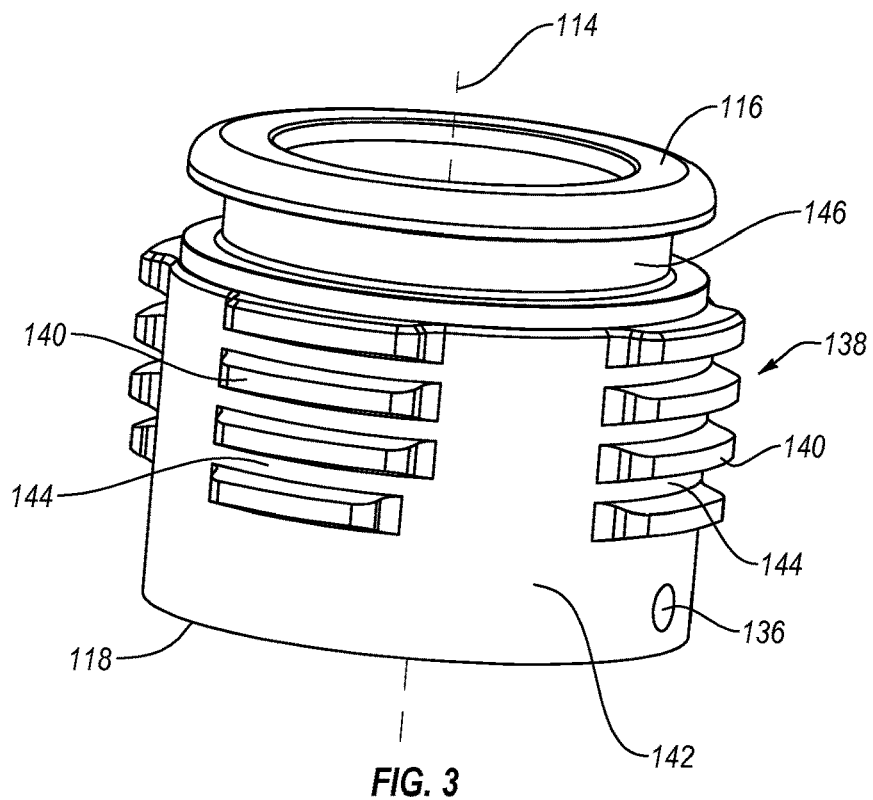
FIG. 3 is an isometric view of the adaptor shown in FIG. 1.
Figure 4:
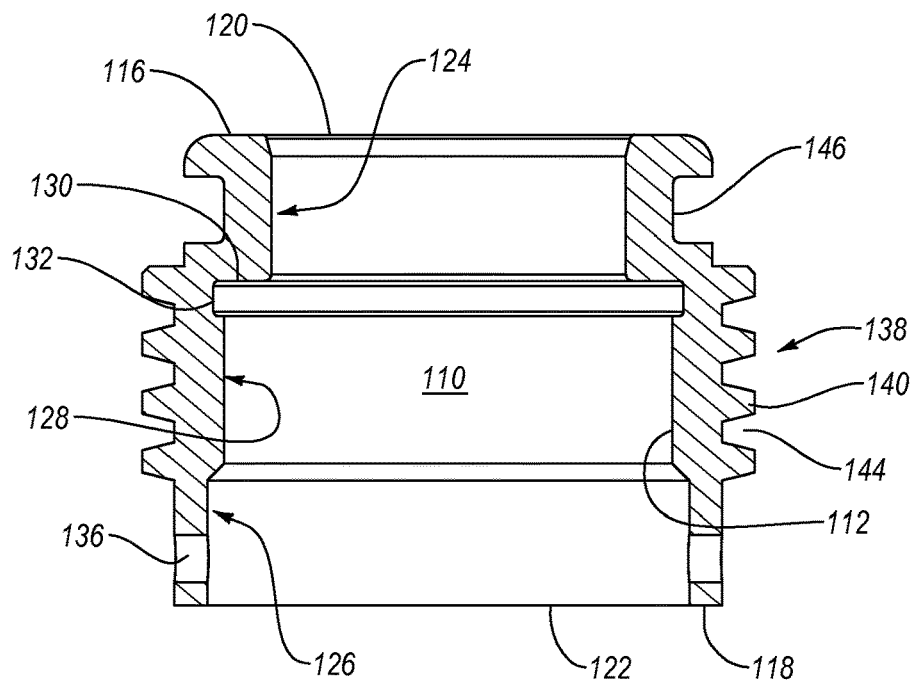
FIG. 4 is a cross-sectional view of the adaptor shown in FIG. 3 taken along line 4-4.

As seen in FIGS. 3 and 4, the adaptor 102 can include an axial bore 110 having a peripheral internal bore wall 112 and a bore central axis 114. The axial bore 110 can have any desired shape, but is shown having a generally circular or cylindrical shape. The adaptor 102 includes an adaptor top 116 and an adaptor bottom 118, and the axial bore 110 is arranged so that the top opening 120 of the axial bore 110 is located at or adjacent to the adaptor top 116 and the bottom opening 122 of the axial bore 110 is located at or adjacent the adaptor bottom 118. This arrangement allows grease, sealant, and/or other product to flow from the product barrel through the adaptor 102.

The axial bore 110 includes an upper bore area 124 located toward the adaptor top 116, a lower bore area 126 located towards the adaptor bottom 118, and an intermediate bore area 128 in between the upper bore area 124 and the lower bore area 126. The upper bore area 124, the lower bore area 126, and the intermediate bore area 128 can be concentric with the bore central axis 114. The lower bore area 126 can have a larger diameter than the intermediate bore area 128. The intermediate bore area 128 can have a larger diameter than the upper bore area 124.

The intermediate bore area 128 can include a threaded portion. The threaded portion can facilitate a number of different types of connections. For instance, the threaded portion can be arranged to threadedly connect to the threads of a product barrel inserted into the bottom opening 122 of the axial bore 110. The adaptor 102 thus may be placed over a threaded end portion of a product barrel, and may be screwed down onto the product barrel.

The threaded portion can be substantially similar to the threads on a conventional closure. As such, the safety closure 100 can be attached and/or retrofitted to a variety of commercially available product barrels. Alternatively, the threaded portion can be arranged to threadedly attach to a specific product barrel. Moreover, unlike known closures of a unitary construction, the two-part configuration of the safety closure 100 allows the adaptor 102 to remain on the product barrel during replacement and/or replenishment of the product (e.g., grease, sealant, lubricant, etc.) within the product barrel of the pumping system, making the safety closure 100 more efficient and easier to use.

The intermediate bore area 128 can terminate at an upper radial shoulder or abutment 130. The upper abutment 130 can provide a stop for engaging the end of the product barrel inserted into the bottom opening 122 of the adaptor 102. This can offer an index or indicator so that the person installing the adaptor 102 can tell whether the product barrel has been fully or properly inserted into the axial bore 110 when using the adaptor 102.

Optionally, the intermediate bore area 128 can include an undercut recess or annular groove 132 that terminates below the upper abutment 130. The annular groove 132 can help form a sealed connection between the adaptor 102 and the product barrel. For instance, the annular groove 132 can receive a sealing member (e.g., an O-ring) and/or may be filled with grease or a sealant to form a seal between the adaptor 102 and the product barrel. The lower bore area 126 can optionally terminate at a chamfered edge 134.

One or more fastener holes 136 can be formed in the adaptor 102. The fastener holes 136 can extend through the radially outer surface of the adaptor 102 and the peripheral internal bore wall 112 within the lower bore area 126. The fastener holes 136 are arranged to receive fasteners, such as set screws such that the screws extend radially into the lower bore area 126 where they can engage or bite into an outer surface of the product barrel, helping to secure the product barrel within the axial bore 110.

The radially outer surface of the adaptor 102 defines a rapid connection mechanism 138 (also shown in FIG. 1) arranged to selectively mate up with a rapid connection mechanism described below on the cap 104. The rapid connection mechanism 138 are shown comprising a plurality of radial ridges 140 protruding radially outward from the outer surface of the adaptor 102 but can exhibit any suitable configuration. The radial ridges 140 can extend generally perpendicular to the bore central axis 114 of the adaptor 102.

The radial ridges 140 can be arranged in discrete groupings with each grouping separated by a gap 142 extending axially between adjacent groups of radial ridges 140. Within each group of radial ridges 140, the individual ridges 140 can be separated from one another by spaces 144 extending circumferentially between the ridges 140. As the seen, the bottom radial ridge 140 in each grouping can have a length that is less than the length of the upper radial ridges 140. This can provide an area at the end of the bottom radial ridge 140 for locating the stopping structure described below.

The radial ridges 140 can be located between the adaptor top 116 and the adaptor bottom 118. For instance, the radial ridges 140 can be formed above the fastener holes 136 and below an annular groove described below.

The radially outer surface of the adaptor top 116 can define an annular groove 146 near the top opening 120. The sealing member 108 (shown in FIG. 1) can be positioned in the annular groove 146. The sealing member 108 may comprise an O-ring, a gasket, or other suitable member defining a through opening dimensioned to be stretched over the adaptor top 116 and placed within the annular groove 146.

The sealing member 108 can be further dimensioned such that when the sealing member 108 is positioned within the annular groove 146, the outer radial surface of the sealing member 108 protrudes radially from the radially outer surface of the adaptor 102. When the cap 104 is inserted onto the adaptor 102 as described in more detail below, the sealing member 108 is arranged to be radially compressed and/or sheared between the inner surface of the cap 104 and the adaptor 102. This advantageously can provide a substantially fluid tight seal between the cap 104 and the adaptor 102 when the cap 104 is secured on the adaptor 102, reducing the likelihood of leakage through the safety closure 100.

The sealing member 108 can include any suitable material. For instance, the sealing member 108 can include an elastomer, rubber, synthetic rubber, polymers, soft metals, combinations thereof, or any other suitable material. Further, the construction of the sealing member 108 can be dependent on a number of factors, such as the type of pumping system, anticipated operating pressure, grease or sealant type, user preference, and/or other factors.

The adaptor 102 can be formed of a metal or alloy thereof, such as for example, high strength carbon steel. While the adaptor 102 is described comprising metal, it will be appreciated that other suitable materials are possible. For instance, the adaptor 102 may comprise polymers, carbon-based or other composites, combinations thereof, or any other suitable material. The construction of the adaptor 102 can be dependent on a number of different factors, such as the type of injection equipment and/or pumping system, the anticipated operating pressure, grease or sealant type, the preference of the user, and/or other factors.

The cap 104 can be positionable on the adaptor top 116 and can include a top wall 138, a bottom 150, and a peripheral sidewall 148 extending between the bottom 150 and the top wall 138. The peripheral sidewall 148 and the top wall 138 can define a receiving space 152 arranged so that the bottom opening 154 of the receiving space 152 is located at or adjacent to the bottom 150 of the cap 104. As shown, the bottom 150 can define at least one locking channel, slot, or notch 156 arranged to selectively receive a lock piece described below.

The top wall 138 defines an opening 151 concentric with the axial bore 110 of the adaptor 102. The opening 151 is arranged to allow rapid passage of lubricants or sealants directly to and/or from the product barrel by way of a pressure hose and/or high pressure fittings from an adjoining pumping system. The opening 151 can be dimensioned for receiving a high pressure or other type of fitting and can include an internally threaded portion arranged to threadedly connect to the threads of the fitting.

Optionally, the radial outer surface of the sidewall 148 can include one or more grip features to allow increased torque by way of the user's hand grip or manual stiction. For instance, a portion of the radial outer surface of the sidewall 148 may be knurled or textured. In other embodiments, the radial outer surface of the sidewall 148 can define wrench flats to receive wrench or other tool for rotating the cap 104, or resisting rotation of the cap 104 as needed.

The radial inner surface of the sidewall 148 can define a rapid connection mechanism 158 (also shown in FIG. 1) arranged to selectively mate up with and engage the rapid connection mechanism 138 of the adaptor 102. The rapid connection mechanism 158 is shown comprising a plurality of radial ridges 160 protruding radially inward from the sidewall 148 but can exhibit any suitable configuration.

The radial ridges 160 can extend generally perpendicular to a longitudinal axis of the cap 104. The radial ridges 160 can be arranged in discrete groupings with each group separated by a gap 162 extending axially between adjacent groups. Within each group, the individual ridges 160 can be separated from one another by spaces 164 extending circumferentially between the ridges 160.

At least one stopping structure 166 (shown in FIG. 1) can be located within one of the spaces 164 between adjacent ones of the radial ridges 160. The stopping structure 166 can span some or all of the distance between the adjacent ridges 160 within the space 164. As described in more detail below, the stopping structure 166 is arranged to mechanically limit the amount of travel of the radial ridges 140 of the adaptor 102 through the spaces 164 of the cap 104. In the illustrated embodiment, the at least one stopping structure 166 comprises a pair of pins 168 (shown in FIG. 1) attached between adjacent ones of the ridges 160 and offset from one another. The pins 168 can be integral to the cap 104 or separate components from the cap 104. For instance, the pins 168 can be attached between the ridges 160 of the cap 104 via holes 170 formed in the bottom 150 of the cap 104.

The stopping structure 166 is shown including a pair of pins 168 but can comprise any suitable configuration. For instance, the stopping structure 166 can include roll pins, bars, welds, or any other appropriate structure. Further, while the cap 104 is described including the stopping structure 166, in other embodiments, the adaptor 102 can include the stopping structure 166.

With the cap 104 positioned on the adaptor 102, a person or end user can move the safety closure 100 between a disengaged position in which the radial ridges 160 of the cap 104 are positioned within the gaps 142 of the adaptor 102 and the radial ridges 140 of the adaptor 102 are positioned within the gaps 162 of the cap 104, and an engaged position in which the radial ridges 160 of the cap 104 are positioned within the spaces 144 between the radial ridges 140 of the adaptor 102 and the radial ridges 140 of the adaptor 102 are positioned within the spaces 164 between the radial ridges 160 of the cap 104.

The radial ridges 140, 160 can engage one another in the engaged position such that they resist relative movement between the cap 104 and the adaptor 102 in the axial direction. In the disengaged position, the radial ridges 160 of the cap 104 can move axially through the gaps 142 of the adaptor 102 such that the cap 104 can be separated from the adaptor 102.

To move the safety closure 100 between the engaged and disengaged position, a user can rotate the cap 104 relative to the adaptor 102 a partial turn or vice versa. Because a user only has to rotate the cap 104 a partial turn to remove the cap 104 from the safety closure 100 and/or to install the cap 104 on the adaptor 102, the cap 104 can be quickly and easily removed from and/or connected to the adaptor 102, reducing the time and labor required to employ the safety closure 100. Further, without the requirement of repeated threading the safety closure on the product barrel, the safety closure 100 can be manipulated with a greasy hand and the likelihood of the safety closure 100 being dropped and/or damaged during installation is reduced.

The radial ridges 140, 160 can be arranged such that between about twenty degrees and about one-twenty degrees, about thirty degrees and about one-hundred degrees, or about forty-five degrees and about eighty degrees of relative rotation between the cap 104 and the adaptor 102 moves the safety closure 100 between the engaged and disengaged positions. In other embodiments, the rapid connection mechanisms 138, 158 can be arranged such that more or less relative rotation between the cap 104 and the adaptor 102 move the safety closure 100 between the engaged and disengaged positions.

Figure 7:
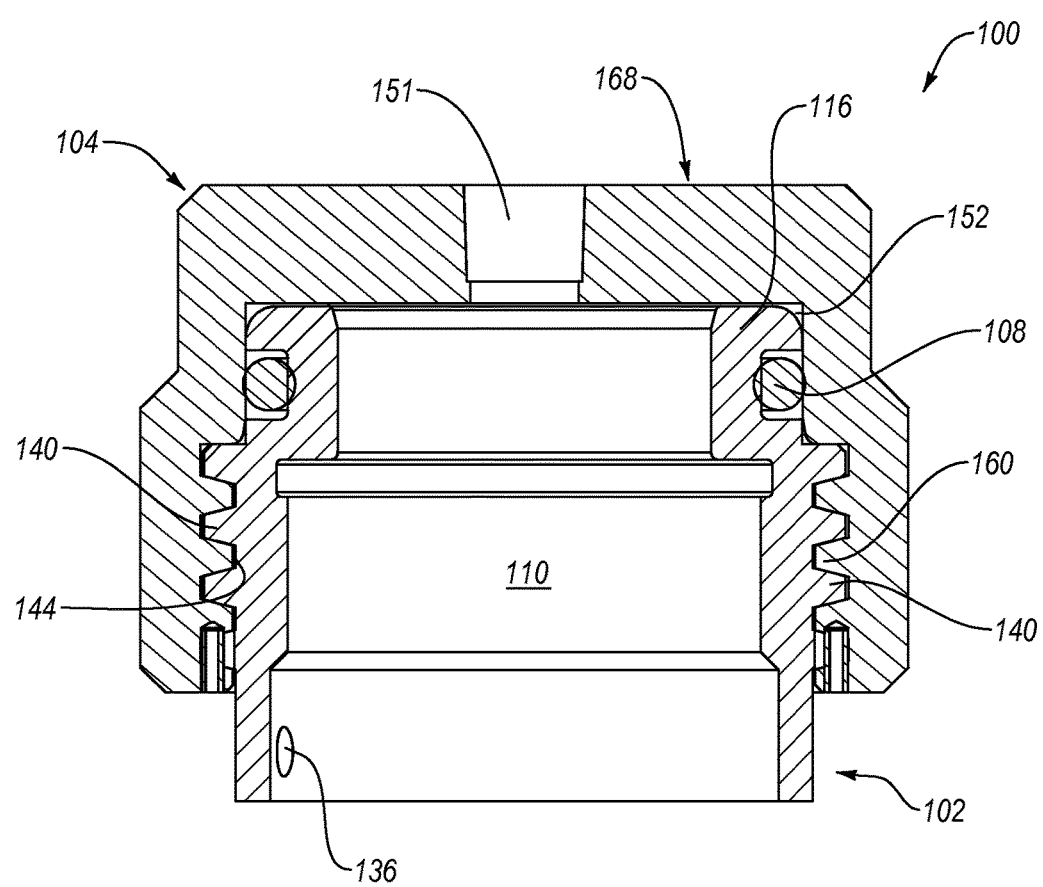
FIG. 7 is a cross-sectional view of the safety closure shown in FIG. 2 taken along line 7-7.

Referring to FIG. 7, a person or end user installing the safety closure 100 on a product barrel (e.g., the product barrel 429 in FIG. 10) will threadedly connect the adaptor 102 to the threads of the upper end of the product barrel, securing the adaptor 102 to the product barrel. Optionally, set screws can be threaded through the fastener holes 136 to engage an outer surface of the product barrel, helping to secure the adaptor 102 to the product barrel. The upper end of the product barrel can be threaded into the adaptor 102 until the top edge of the product barrel engages the upper abutment 130 within the axial bore 110, providing an index or indictor that the product barrel has been fully or properly inserted in the axial bore 110 of the adaptor 102.

The user can then position the cap 104 over the adaptor 102, aligning the radial ridges 160 of the cap 104 with the gaps 142 of the adaptor 102. The user can then lower the cap 104 onto the adaptor 102, passing the radial ridges 160 of the cap 104 through the gaps 142 of the adaptor 102. As the adaptor 102 passes through the receiving space 152 of the cap 104, the internal surface of the cap 104 moves over and compresses the sealing member 108 between the adaptor 102 and the cap 104. The cap 104 can be lowered onto the adaptor 102 until the adaptor top 116 is at or near the bottom surface of the top wall 138 of the cap 104.

To secure the cap 104 on the adaptor 102, the user can move the safety closure 100 to the engaged position by rotating the cap 104 relative to the adaptor 102 such that the radial ridges 160 of the cap 104 move into the spaces 144 of the adaptor 102 and mate with and/or engage with the radial ridges 140 of the adaptor 102.

As the cap 104 is rotated, it can place the seating member 108 in shear, forming a substantially fluid tight seal between the cap 104 and the adaptor 102. As discussed above, the pins 168 extending through the spaces 144 of the cap member 104 can prevent the cap 104 from being over rotated. They can also prevent the cap 104 from being under-rotated by providing an indicator or index for the user, ensuring proper engagement between the cap 104 and the adaptor 102 and ensuring that the rapid engagement mechanisms are in effect.

If pressure is present in the product barrel and the safety closure 100 is in the engaged position, the pressure can push the cap 104 axially away from the adaptor 102 a small distance, which, in turn, causes the radial ridges 160 of the cap 104 to physically engage with the radial ridges 140 of the adaptor 102. Tolerances defined between the radial ridges 140, 160 allow for such movement between the cap 104 and the adaptor 102. This forced engagement between the radial ridges 140, 160 can generate friction between the cap 104 and the adaptor 102 that helps resist undesired relative rotation between the cap 104 and the adaptor 102. This is advantageous because known closures tend to back out or unthread in response to the buildup of pressure within a pumping system.

The rapid connection mechanisms 138, 158 can also help the safety closure 100 withstand higher operating pressures within the pumping system. For instance, when pressure builds up within the safety closure 100 it can tend to push the cap 104 in a direction away from the adaptor 102, which, in turn, causes the radial ridges 160 of the cap 104 to engage with the radial ridges 140 of the adaptor 102. By increasing the contact surface area between the radial ridges 140, 160, the capacity of the radial ridges 140, 160 to resist the pressure pushing the cap 104 away from the adaptor 102 is increased, helping the safety closure 100 to withstand higher operating pressures.

The safety closure 100 can be arranged to withstand operating pressures greater than about 5000 psi, about 6000 psi, about 7000 psi, about 9000 psi, about 10,000 psi, or about 11,000 psi. In other embodiments, the safety closure 100 can be arranged to withstand higher or lower pressures.

To remove the cap 104 from the adaptor 102, the safety closure 100 can be moved to the disengaged position by rotating the cap 104 in the opposite direction until the radial ridges 160 of the cap 104 are aligned with the gaps 142 (shown in FIG. 3) of the adaptor 102 and the radial ridges 140 of the adaptor 102 are aligned with the gaps 162 of the cap 104. With the radial ridges 140, 160 aligned in the gaps 142, 162, the cap 104 can be translated or pulled away from the adaptor 102 and removed therefrom. Because a user only has to rotate the cap 104 a partial turn to remove the cap 104 from the adaptor 102, the cap 104 can be quickly and easily removed from adaptor 102.

Figure 5:
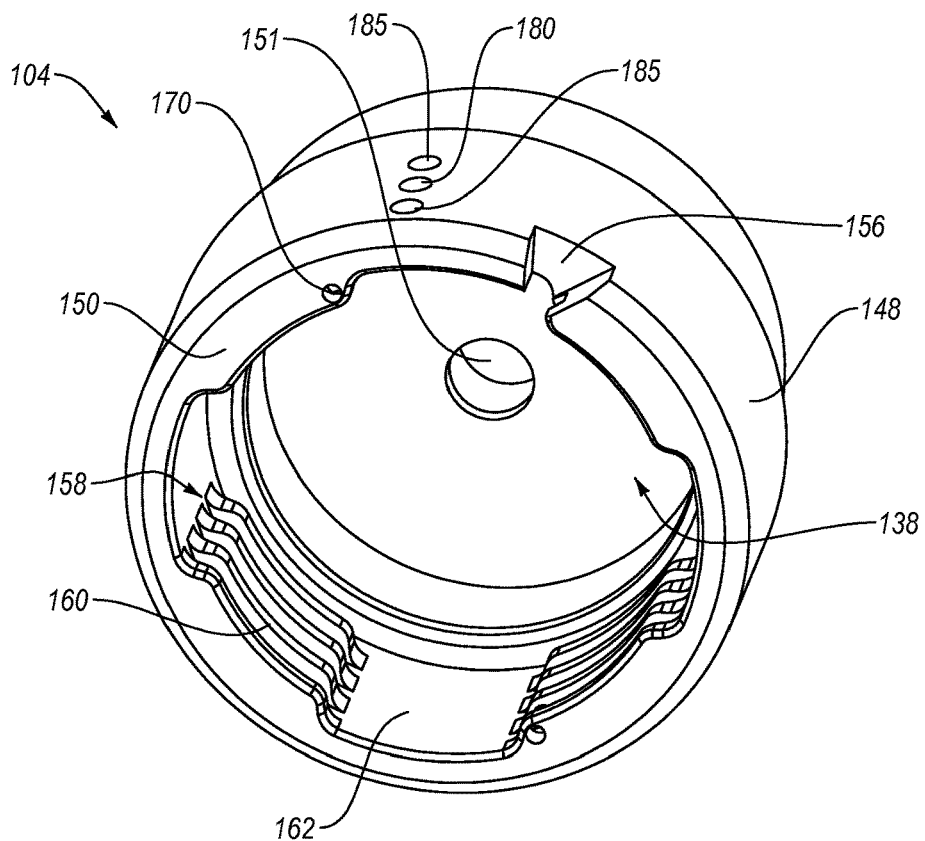
FIG. 5 is an isometric view of the cap shown in FIG. 1.
Figure 6:
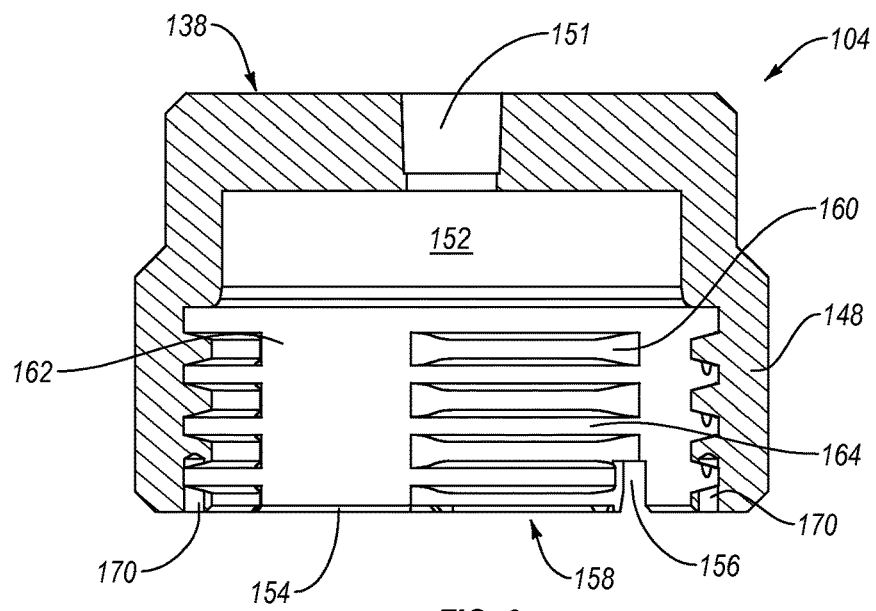
FIG. 6 is a cross-sectional view of the cap shown in FIG. 5 taken along line 6-6.
Figure 8:
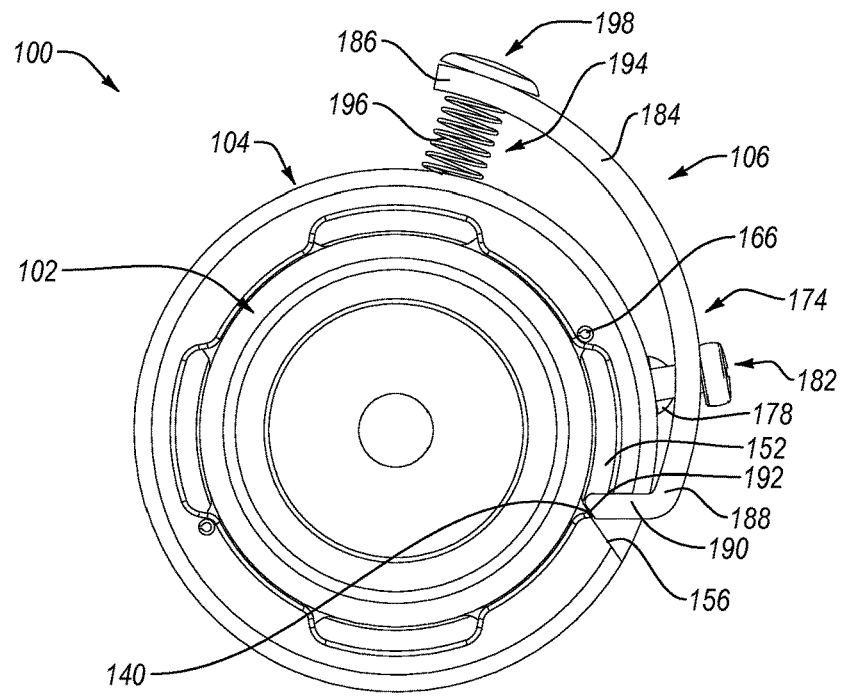
FIG. 8 is a bottom view of the safety closure shown in FIG. 2.
Figure 9:
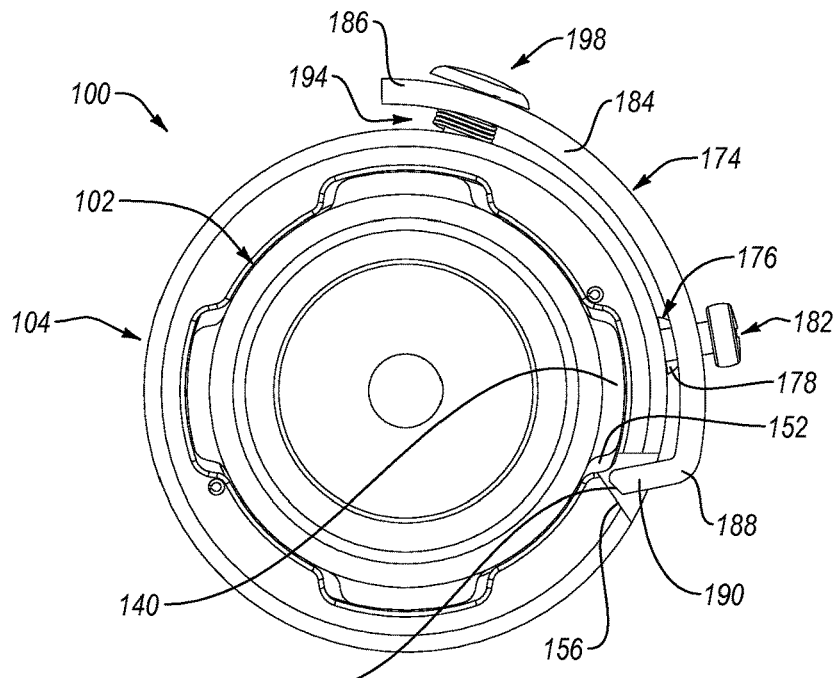
FIG. 9 is another bottom view of the safety closure shown in FIG. 2.

Referring to FIGS. 8 and 9, the locking system 106 is arranged to selectively lock the safety closure 100 in the engaged position in a safe and ergonomic manner. As best seen in FIGS. 1 and 8, the locking system 106 includes a locking arm 174 pivotally attached to the radial outer surface of the cap 104. The locking arm 174 is arranged to pivot about a pivot point 176 defined a drive screw 178 (also shown in FIG. 1) secured in a mounting hole 180 (shown in FIG. 5) formed in the outer surface of the cap 104. A bottom surface of the locking arm 174 can engage a head portion of the drive screw 178.

A pair of fasteners 182 (also shown in FIG. 1) can extend through fastener holes 185 (shown in FIG. 5) in the locking arm 174 and the cap 106. The fasteners 182 are arranged to secure the locking arm 174 to the cap 106. The fasteners 182 are arranged on opposite sides of the drive screw 178, balancing and/or stabilizing the locking arm 174 on the head portion of the drive screw 178.

Alternatively, the locking arm 174 can pivot about a pivot point defined by a pair of drive screws secured in the attachment holes. The bottom surface of the locking arm 174 can engaged the head portions of the drive screws. A fastener can extend through a fastener hole in the locking arm and a center attachment hole in the cap member between the drive screws.

The locking arm 174 can include an elongate body 184 having a first end portion 186 and a second end portion 188. A tooth or lock piece 190 can be attached to the second end portion 188 and can extend at an angle relative thereto.

The lock piece 190 is arranged to selectively protrude into the receiving space 152 of the cap 106 via the notch 156. The lock piece 190 defines a locking surface 192 arranged to engage an end of one of the radial ridges 140 and/or 160. The lock piece 190 includes a generally rectangular shape but can exhibit any suitable configuration. For instance, the lock piece 190 can have a generally triangular shape, a tooth-like shape, a wedge-like shape, an arcuate shape, an irregular geometric shape, combinations thereof, or any other suitable shape.

The locking arm 174 pivots between an unlocked position shown in FIG. 9 and a locked position shown in FIG. 8. In the unlocked position the first end portion 186 of the locking arm 174 is pivoted toward the radial outer surface of the cap 104 and the lock piece 190 on the second end portion 188 is pivoted out of the receiving space 152. In the locked position, the lock piece 190 is pivoted toward the cap 104 and extends into the receiving space 1152 via the notch 156.

When the safety closure 100 is in the engaged position, the lock piece 190 in the locked position can engage at least one of the radial ridges 140 of the adaptor 102, locking the radial ridges 140 in the spaces between radial ridges 160 of the cap 104, which, in turn, locks the cap 104 in the engaged position on the adaptor 102. This advantageously prevents the cap 104 from undesirably moving from the engaged position to the disengaged position, for example, in response to buildup of pressure within the pumping system, increasing user or operator safety.

The radial ridges 140 of the adaptor 102 can include a leading edge having an angle, tapered or curved configuration, facilitating movement of the lock piece 190 into the locked position over the leading edge of the radial ridge 140.

When the safety closure 100 is in the disengaged position, the lock piece 190 in the locked position can block at least one of the radial ridges 140 of the adaptor 102 from entering the space between the radial ridges 160 of the cap 104, preventing the safety closure 100 from moving into the engaged position until the locking system 706 is actuated by the user.

A biasing mechanism 194 can bias the locking arm 174 toward the locked position. The biasing mechanism 194 is situated between the first end portion 186 of the locking arm 174 and the cap 104 and is arranged to push the first end portion 186 of the locking arm 174 away from the cap 104, creating a pivoting action that moves the second end portion 188 and the lock piece 190 downwardly toward the cap 104 and into engagement with the radial ridges 140 and/or 160.

The biasing mechanism 194 is shown comprising a spring 196 but can comprise any suitable biasing mechanism. For instance, the biasing mechanism 194 can be a radial acting, linear spring, a leaf spring, a polymeric member, or any other suitable biasing mechanism.

A fastener 198 can extend through an aperture in the first end portion 186 to secure the biasing mechanism 194 between the locking arm 174 and the cap 104. The fastener 198 can be a rivet including a head and a stem portion extending into a central opening in the biasing mechanism 194. This can help keep the biasing mechanism 194 located between the locking arm 174 and the cap 104. It can also provide a guide for the biasing mechanism 194.

To install the locking system 106 on the safety closure 100, a user can secure the drive screw 178 to the cap 104 and the fastener 198 to the first end portion 186 of the locking arm 174. The user can then position the biasing mechanism 194 on the stem of the fastener 198. The fasteners 182 can then be inserted through the apertures in the second end portion 188 of the locking arm 174 and attached to the cap 104, positioning the second end portion 188 between the heads of the fasteners 182 and the head of the drive screw 178. With the second end portion 188 located between the head of the drive screw 178 and the heads of the fasteners 182, the locking arm 174 can pivot on the pivot point 176.

The locking arm 1174 can be contoured to generally correspond to the curvature of the outer radial surface of the cap 104, allowing the locking system 106 to be quickly and safely moved between the locked and unlocked positions. When a user wants to remove the cap 104 from the adaptor 102, the user can place a hand over the top of the cap 104 with at least some of the user's fingers positioned on the locking arm 174 toward the first end portion 186. As the user grips and twists the cap 104 (e.g., in a counterclockwise direction) the user's fingers along the curvature of the locking arm 174 naturally push down on the first end of the locking arm 174, which, in turn, radially compresses the biasing mechanism 194.

As the biasing mechanism 194 is compressed and the first end portion 186 of the locking arm 174 is pushed toward the radial outer surface of the cap 104, the lock piece 190 on the second end portion 188 of the locking arm 174 pivots about the pivot point 176 and away from the adaptor 102. This moves the locking system 106 to the unlocked position, creating a clearance between the lock piece 190 and the radial ridges 140 such that the lock piece 190 can clear the radial ridges 140 during twisting. With the locking arm 174 in the unlocked position, the safety closure 100 can be twisted to the disengaged position and pulled apart.

The adaptor 102 can be inserted into the cap 104 and the safety closure 100 can also be quickly and easily moved to the engaged position with the locking arm 174 in the unlocked position. When the user releases its grip from the cap 104, the biasing mechanism 194 automatically moves the first end portion 186 of the locking arm 174 away from the cap 104. This in turn moves the lock piece 190 of the locking arm 174 to the locked position, locking the safety closure 100 in the engaged position.

The user can thus attach and/or remove the cap 104 from the adaptor 102 using only one hand if needed and/or in a single action. As such, the safety closure 100 reduces the likelihood of operator injuries and/or can be more efficiently utilized in the field.

Further, because the safety closure 100 does not require the user to struggle with a tightly threaded connection to pump product through the pumping system as in the prior art, the user can manipulate the safety closure 100 with a greasy hand and/or while carrying a tool in one hand.

Figure 10:
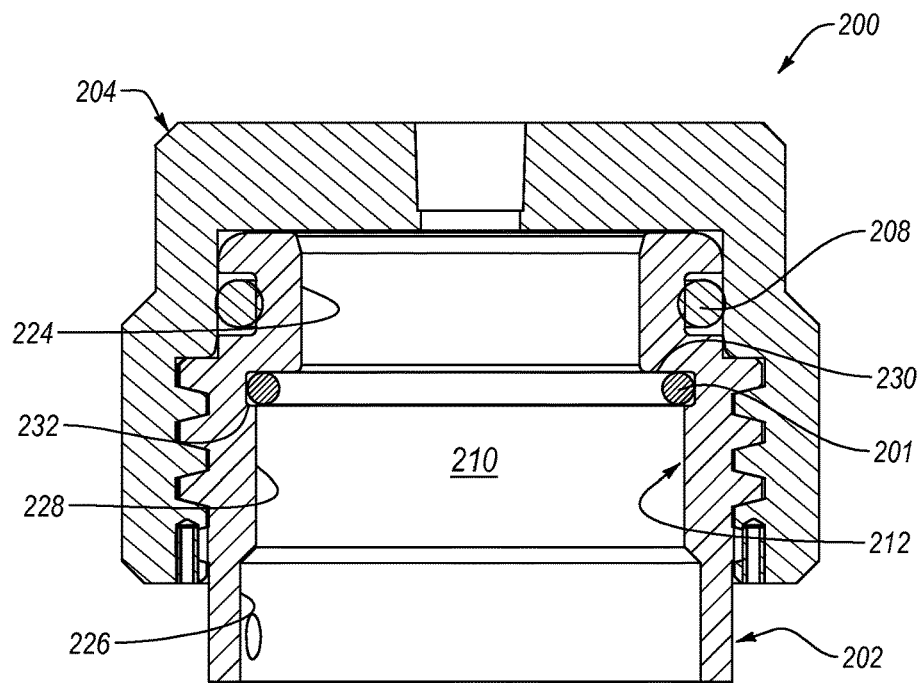
FIG. 10 is a cross-sectional view of a safety closure according to another embodiment.

A second exemplary embodiment of a safety closure 200 is shown in FIG. 10. As seen, the safety closure 200 can be similar to the safety closure 100 except that a sealing member 201 is positioned within the axial bore 210. The safety closure 200 can include an adaptor 202, a cap 204, a locking system, and a sealing member 208 located between the cap 204 and the adaptor 202.

As seen the adaptor 202 includes the axial bore 210 having an upper bore area 224, a lower bore area 226, and an intermediate bore area 228. The intermediate bore area 228 includes an annular groove 232 that terminates below an upper abutment 230.

The sealing member 201 can be positioned in the annular groove 232, The sealing member 201 may comprise an O-ring, a gasket, or other suitable member. When the product barrel of the pumping system is inserted into the axial bore 210 of the adaptor 202, the sealing member 201 is arranged to be radially compressed and/or sheared between the peripheral internal bore wall 212 and the outer surface of the product barrel. This can form a seal between the adaptor 202 and the product barrel, reducing the likelihood of leakage between the product barrel and the adaptor 202. The safety closure 200 can thus form a first seal between the adaptor 202 and the product barrel and a second seal between the adaptor 202 and the cap 204, providing multiple boundaries to prevent leakage from the safety closure 200.

Figure 11:
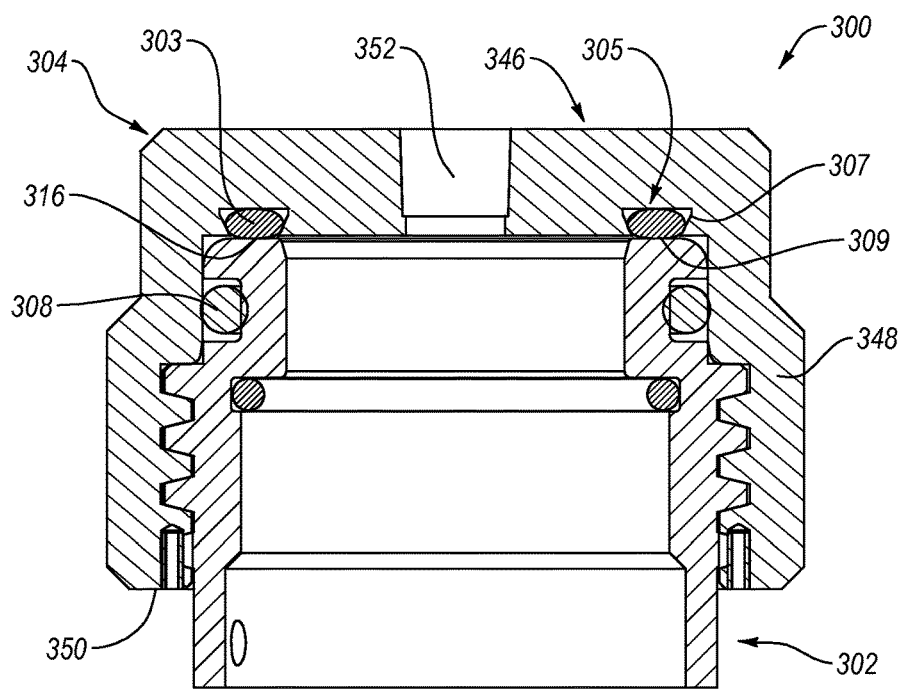
FIG. 11 is a cross-sectional view of a safety closure according to another embodiment.

A third exemplary embodiment of a safety closure 300 is shown in FIG. 11. The safety closure 300 can be similar to the safety closures 100 and 200 except that a sealing member 303 is positioned in the top wall 346 of the cap 304. The safety closure 300 includes an adaptor 302, a cap 304, a locking system, and a sealing member 308 located between the cap 304 and the adaptor 302.

The cap 304 is positionable on the adaptor top 316 and includes a top wall 346, a bottom 350, and a peripheral sidewall 348 extending between the bottom 350 and the top wall 346. The top wall 346 can define an opening 352 arranged to allow passage of a product directly to and/or from the product barrel by way of a pressure hose and/or fitting from an adjoining pumping system.

The bottom surface of the top wall 346 can define an annular groove 305. The annular groove 305 can have a dovetail cross-sectional shape including sidewalk 307 that taper from an upper face of the groove 305 toward a bottom opening 309.

The sealing member 303 can be positioned in the annular groove 305. The sealing member 303 may comprise an O-ring, a gasket, or other suitable member. The sealing member 303 can be compressible such that it can be forced into the annular groove 305. The shape of the groove 305 can help retain the sealing member 303 in the annular groove 305. Once the sealing member 303 is situated in the groove 305, the further the sealing member 303 is forced toward the bottom opening 309, the more the sealing member 303 is wedged between the sidewalk 307 within the groove 305.

When the cap 304 is installed on the adaptor 302, the sealing member 303 is arranged to be compressed and/or sheared between the adaptor top 316 and the cap 304. This can form a seal between the adaptor top 316 and the cap 304, reducing the likelihood of leakage of product between the adaptor 316 and the cap 304.

This is advantageous because when pumping a viscous or highly viscous product through the safety closure 300, the product may have the tendency to extrude or flow over the adaptor top 316 and the outer surface of the adaptor 302 down to the sealing member 308 between the adaptor 302 and the cap member 304. The presence of viscous product between the adaptor 302 and the cap member 304 can create stiction or a static friction that needs to be overcome for the cap member 304 in contact with the adaptor 302 to move, increasing the likelihood of the cap 304 getting stuck on the adaptor 302 or being difficult to twist off.

By arranging the seal member 303 in the groove 305 of the cap 304, an additional seal or boundary is formed between the cap 304 and the adaptor top 316 to limit or prevent viscous product from oozing up and over the adaptor 302 and down in between the adaptor 302 and the cap 304. This has the effect of keeping the product within the product barrel and the axial bore 310, reducing the likelihood of the cap 304 getting stuck on the adaptor 302. It will be appreciated that if a user is not pumping a viscous or highly viscous product, the seal member 303 can be removed and/or omitted from the safety closure.

The safety closure 300 may include one or more other features to reduce the likelihood of stiction between the cap 304 and the adaptor 302. For instance, one or more portions of the inner surface of the cap 304 can include a surface finish and/or a surface preparation arranged to reduce friction between the cap 304 and the adaptor 302, which can reduce stiction. The bottom surface of the top wall 346 of the cap 304 can be provided with a textured or roughened surface to reduce friction between the adaptor top 316 and the cap 304, which, in turn, reduces the likelihood of stiction. In other embodiments, one or more portions of the inner surface of the cap 304 can be covered with a low friction coating or material like polytetrafluoroethylene ("PTE") to help limit or eliminate stiction between the adaptor 302 and the cap 304.

Figure 12:
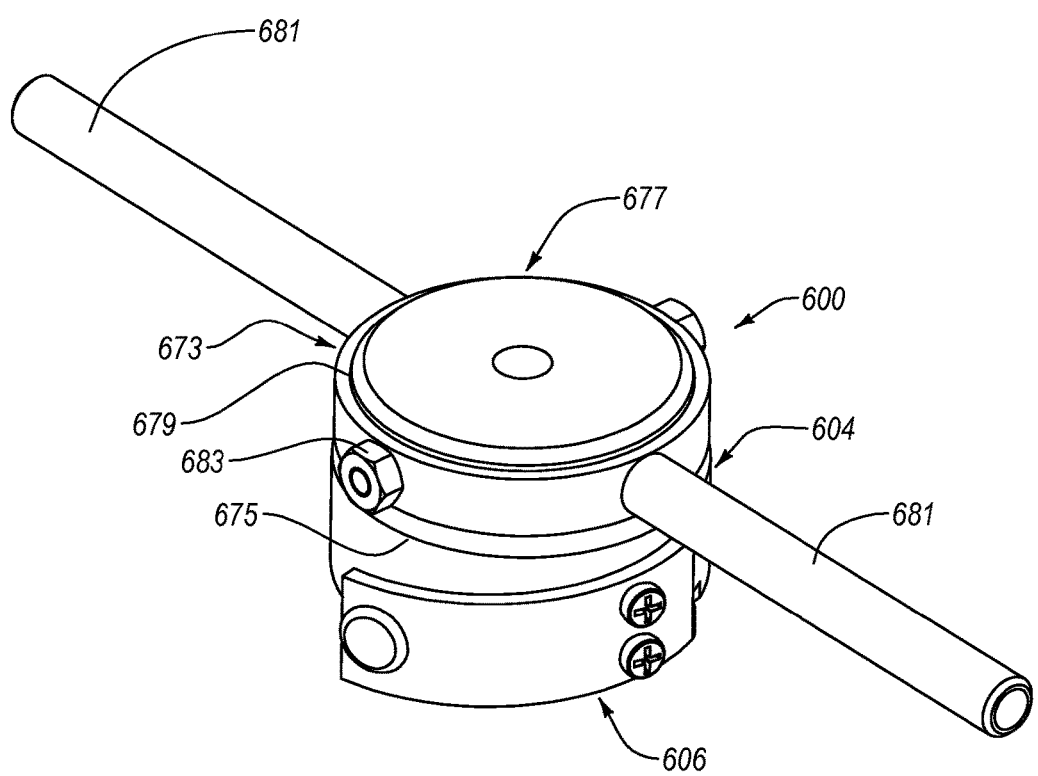
FIG. 12 is an isometric view of a safety closure according to another embodiment.

A fourth exemplary embodiment of a safety closure 600 is shown in FIG. 12. The safety closure 600 can be similar to the other safety closures except that a handle assembly 673 is removably attached to the cap 604. The safety closure 600 includes an adaptor, the cap 604, and a locking system 606. The radial outer surface of the cap 604 defines an abutment 675.

The handle assembly 673 can include a ring member 677 defining a center opening 679. Two arms 681 having an elongate configuration extend radially outward from the outer surface of the ring member 677. The arms 681 can be integral to the ring member 677 or attached thereto. For instance, each of the arms 681 can be attached to the ring member 677 via a weld.

The ring member 677 can be attached to the cap 604 in any suitable manner. The ring member 677 can be removably attached to the cap 604. For instance, one or more fasteners 683 can be extendable through holes formed in the ring member 677. The fasteners 683 can be set screws which are arranged to protrude into the center opening 679 of the ring member 677.

To install the handle assembly 673 onto the cap 604, the center opening 679 of the ring member 677 can be placed over the cap 604 and the bottom of the ring member 677 can be lowered onto the abutment 675 of the cap 604. The fasteners 683 can then be advanced through the holes in the ring member 677 such that they bite or engage into the outer surface of the cap 604, securing the handle assembly 673 on the cap 604.

As is well-known, torque is often defined as a rotational force transferred down a shaft axis from a point of force application on a lever arm. The magnitude of a torque is directly proportional to a magnitude of the applied force (including the angle of force application) multiplied by a length of the lever arm between the rotational axis and the point of force application.

As seen, each of the arms 681 is elongate or relatively long. This arm length improves the torqueability of the cap 604 by facilitating the application of a significant amount of torque down the arms to the ring member 677, which, in turn, facilitates removal and/or installation of the cap 604 on the adaptor when the handle assembly 673 is attached to the cap 604.

The handle assembly 673 can also be a carrying handle for carrying a pumping system (e.g., the pumping system shown in FIG. 13) associated with the safety closure. Looking downward onto the handle assembly 673, the arms 681 can be aligned or substantially aligned along an imaginary line extending through the ring member 677.

When the safety closure 600 is secured on a product barrel of the pumping system, the handle assembly 673 can be attached to the cap 604 such that the arms 681 extend out to the sides of the pumping system rather than extending generally forward and back from the front of the pumping system. Because of the length of the arms 681, a user can grab onto the arms and easily use them to early the pumping system, providing a useful carrying handle. Because of the position of the arms 681, the user can carry the pumping system by the arms 681 without the arms 681 hitting the body or shins of the user, providing an ergonomic handle. The position of the arms 681 also allows the user to balance and/or stabilize the weight of the pumping system while carrying the pumping system.

If desired, a user can adjust or change the position of the arms 681 relative to the pumping assembly by rotating the ring member 677 around the longitudinal axis of the cap 604 before advancing the fasteners 683 through the holes to bite into the outer surface of the cap 604. This advantageously allows the user to customize the carrying position of the pumping assembly when the cap 604 is attached to the pumping system.

Figure 13:
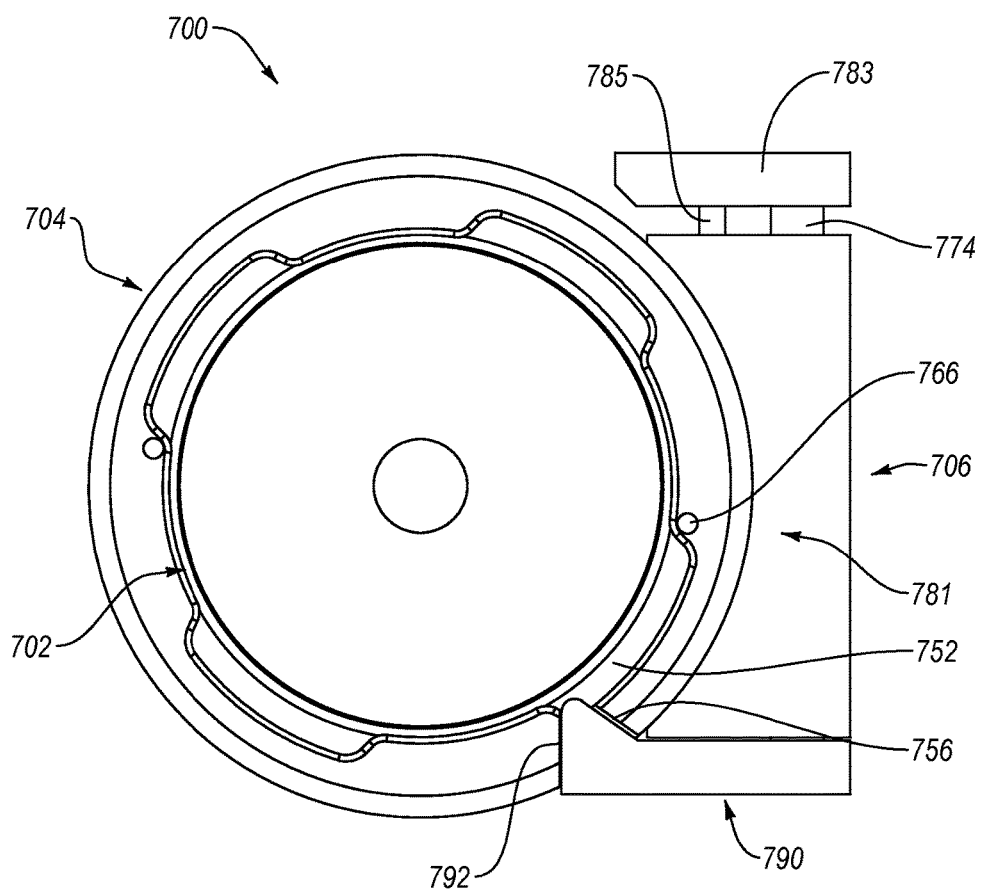
FIG. 13 is a bottom view of a safety closure according to another embodiment.

A fifth exemplary embodiment of a safety closure 700 is shown in FIG. 13. The safety closure 700 can be similar to the other safety closures. The safety closure 700 includes an adaptor 702, a cap 704, and a locking system 706.

The locking system 706 can include a base 781 attached to the outer radial surface of the cap 704. The base 781 can include an inner radial surface contoured to generally correspond to the outer radial surface of the cap 704. The base 781 defines a channel extending therethrough. A locking arm 774 is slidably positioned within the channel of the base 781. The locking arm 774 can include a first end portion and a second end portion. A tooth or lock piece 790 can be attached to the second end portion of the locking arm 774. The lock piece 790 can extend at an angle relative to the locking arm 774.

The locking arm 774 is arranged to selectively protrude into the receiving space 752 of the cap 704 via a notch 756 formed in the bottom of the cap 704. The lock piece 790 can exhibit any suitable configuration. The lock piece 790 defines a locking surface 792 arranged to engaged an end of one of the radial ridges of the adaptor 702.

The locking arm 774 moves in a tangential direction relative to the radial outer surface of the cap 704 between an unlocked position and a locked position (shown in FIG. 13.

In the unlocked position, the first end portion of the locking arm 774 is located at or near a first end of the base 781, which, in turn, spaces the lock piece 790 on the second end of the locking arm 774 away from the cap 704 and substantially out of the receiving space 752. In the locked position, the first end portion of the locking arm 774 is separated from the first end of the base 781 by a distance, which, in turn, moves the lock piece 790 on the second end of the locking arm into the receiving space 752 via the notch 756.

When the safety closure 700 is in the engaged position, the lock piece 790 in the locked position can engage at least one of the radial ridges of the adaptor 702, locking the radial ridge between the lock piece 790 and the stopping structure 766 extending between radial ridges 760 of the cap 704, which, in turn, locks the cap 704 in the engaged position on the adaptor 702. This advantageously prevents the cap 704 from undesirably moving from the engaged position to the disengaged position, for example, in response to buildup of pressure within the pumping system, increasing user or operator safety.

When the safety closure 700 is in the disengaged position, the lock piece 790 in the locked position can prevent the safety closure 700 from moving into the engaged position by preventing movement of the at least one of the radial ridges of the adaptor 702 into the space between the radial ridges 760 of the cap 704.

A thumb or actuator part 783 can be attached to the first end portion of the locking arm 774 extending beyond the first end of the base 781. The actuator part 783 is arranged to facilitate movement of the locking system 706 between the locked and unlocked positions.

A roll pin 785 can be situated between the actuator part 783 and the first end of the base 781. The roll pin 785 secures the rotational position of the actuator part 783 relative to the first end of the base 781. The roll pin 785 can include a first end situated in a hole defined by the actuator part 783 and a second end situated in a hold defined by the first end of the base 781.

A biasing mechanism can bias the locking arm 774 toward the locked position. The biasing mechanism can be situated in any suitable location. The biasing mechanism can be positioned within the channel of the base 781. Alternatively, the biasing mechanism can be the roll pin 785.

The configuration of the safety closures described herein is to be regarded as exemplary only, as any suitable configuration of the safety closure is possible. For instance, the adaptor can be a female connector and the cap can be a male connector. In other embodiments, the locking arm can have an angular configuration. While the axial bore is shown including areas with different diameters, in other embodiments, the axial bore can have a constant diameter. In other embodiments, the axial bore does not include an annular groove. In yet other embodiments, the sealing member may be integrally molded or formed in the annular groove within the axial bore. Further it will be appreciated that the safety closure can include a plurality of sealing members or alternatively no sealing members.

In other embodiments, the rapid engagement members can extend at one or more oblique angles relative to the longitudinal axis of the safety closure. The rapid engagement members can be angled such that when the cap is rotated relative to the adaptor, the engagement between the rapid engagement members pulls the cap onto the adaptor. In yet other embodiments, the rapid engagement members can be pins, rods, bars, studs, combinations thereof, or any other suitable configuration.

In other embodiments, the locking system can include a locking tab on the adaptor and a locking tab on the cap. When the safety closure is in the engaged position, the locking tab on the adaptor can mate up with the locking tab on the cap. A lock pin, a lock, or other locking device may be placed through the locking tabs to lock the safety closure in the engaged position.

While the rapid connection mechanism is described as including corresponding and mating radial ridges, in other embodiments, the safety closure can include other rapid connection mechanisms. For instance, the safety closure can include a bayonet type mount. The adaptor may include one or more radial pins and the cap may include corresponding L-shaped slots with resilient members to help keep the components secured together.

Figure 14:
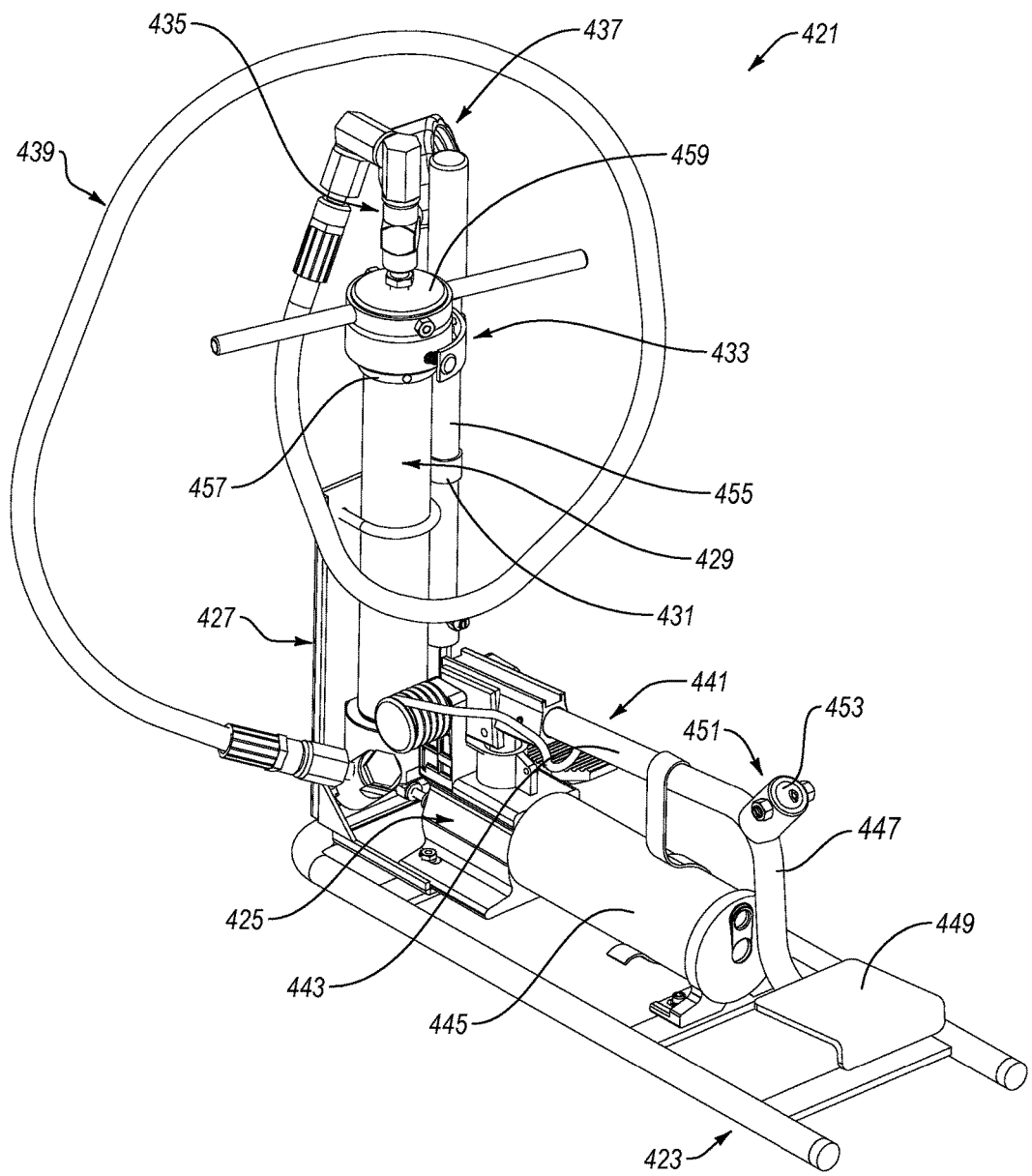
FIG. 14 is a schematic view of a portable pumping system according to an embodiment.

Any of the embodiments of the safety closures described herein may be used in a portable pumping system. FIG. 14 is a schematic view of a portable pumping system 421 according to an embodiment. The system 421 may include a base 423 supporting a pumping assembly 425.

The base 423 may exhibit any suitable configuration. For instance, the base 423 may comprise a u-shaped tubular frame or other structure. A plate 427 can be mounted to the base 423. A product barrel 429 is operatively connected to the pumping assembly 425 and mounted to the plate member 427. Optionally, a carrying handle can be affixed to the plate 427 that is arranged to allow a user to carry the system 421 with either one or two hands. Alternatively, the system 421 can also include a barrel holder having a plurality of tubular bodies for storing product barrels or sticks to be inserted into the product barrel 429.

A safety closure 433 can be attached to the product barrel 429 of the pumping system 421. The safety closure 433 can be configured as any of the previously described embodiments. A high pressure fitting assembly 435 is connected to the safety closure 433 via the top opening of the cap. The high pressure fitting assembly 435 can include a high pressure gauge assembly 437. The high pressure fitting assembly 435 can exhibit any suitable configuration. For example, the high pressure fitting assembly 435 can be configured as any of the fittings and assemblies disclosed in U.S. Pat. No. 4,893,650, the disclosure of which is incorporated herein, by this reference, in its entirety. A high pressure hose 439 can be coupled to the high pressure fitting assembly 435.

The pumping assembly 425 can be any suitable pumping assembly. For instance, the pumping assembly 425 can utilize compressed air, hydraulics, or hand and/or foot pumping.

The pumping assembly 425 can include a pump actuator 441 capable of being actuated by a user. The pump actuator 441 can be hand operated or foot operated. The pump actuator 441 can include a shaft 443 extending over a cylinder portion 445 of the pumping assembly 425. The shaft 443 can include a curved portion 447 that directs the shaft 443 in a downward direction around the rear of the cylinder portion 445, defining a clearance between the shaft 443 and the cylinder portion 445 during operation of the pumping system 421. A foot-operated pedal 449 is attached to a terminal end of the shaft 443 behind the cylinder portion 445.

A bracket member 451 is attached to the curved portion 447 of the shaft 443. The bracket member 451 can be attached to the shaft 443 via mechanical fasteners, a snap type fit, combinations thereof, or any other appropriate methods. The bracket member 451 can be an add-on module, allowing existing pumping systems to be retrofitted with the bracket member 451. Alternatively, the bracket member 451 can be integral to the shaft 443.

The bracket member 451 includes a handle receiving opening 453 arranged to receive a rigid handle 455. The handle receiving opening 453 can be oriented to extend generally normal to the curved portion 447 at between about 30 degrees and about 60 degrees relative to the horizontal, allowing the handle 455 to be inserted in the handle receiving opening 453 and oriented in a more comfortable and/or ergonomic position for pumping.

The handle 455 can be selectively positioned in the handle receiving opening 453 so as to allow hand actuated pumping. When not in use, the handle 455 can be stored in the holder 431.

The safety closure 433 may include an adaptor 457 threadedly attached to the product barrel 429 and a cap 459 removably attached to the adaptor 457. As discussed above, the safety closure 433 can be arranged as any of the embodiments disclosed herein. For instance, the cap 459 and the adaptor 457 may include a plurality of rapid engagement members and a locking system, allowing the cap 459 to be safely and quickly attached to and removed from the adaptor 457.

Figure 15:
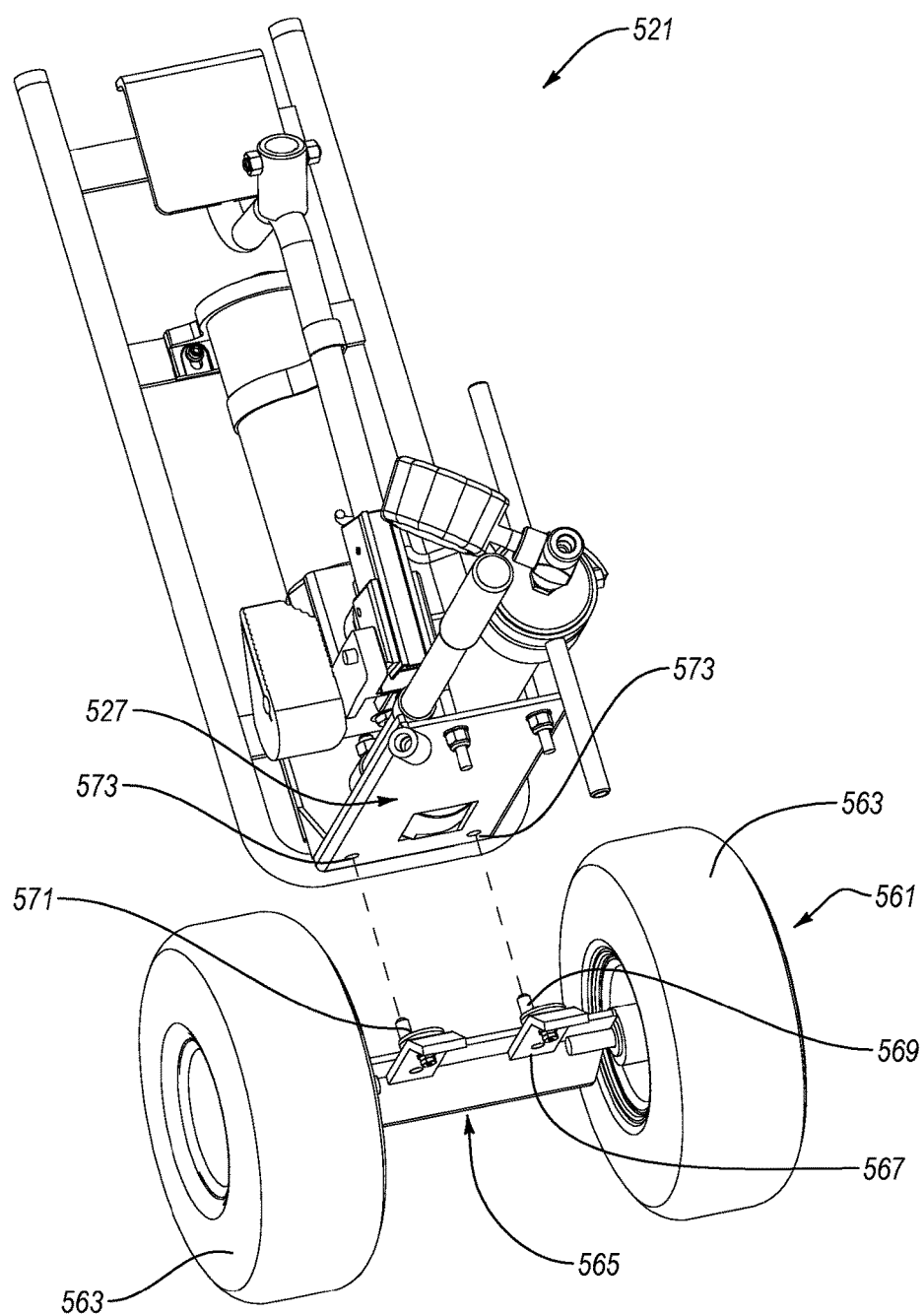
FIG. 15 is schematic view of a portable pumping system according to another embodiment.

FIG. 15 illustrates a pumping system 521 according to another embodiment. The pumping system 521 can be similar to the pumping system 421 except that it includes a wheel assembly 561, allowing the pumping system 521 to be more easily transported.

The wheel assembly 561 is shown removably attached to the plate 527 but can be attached at any suitable location on the pumping system 521. The wheel assembly 561 can include a pair of wheels 563 attached to an axle part 565. The wheels 563 can be oversized, allowing the wheel assembly 561 to be used in muddy and/or snowy terrain. The axle part 565 can be an angle iron or other suitable part. A pair of brackets 567 can be attached to the axle part 565 and a pair of pins or studs 569 can protrude from the axle part 565. One or more magnets 571 can be carried by the brackets 567.

To attach the wheel assembly 561 to the pumping system 521, the pins 569 can be inserted in a pair of corresponding openings 573 formed in the plate 527, toward or at the base 523. The brackets 567 are oriented such that when the studs 569 are inserted in the openings 573 the brackets 567 engage and are attached to an outer face of the plate 527 via the magnets 571, holding the wheel assembly 561 on the pumping system 521.

To remove the wheel assembly 561, the brackets 567 can be pulled away from the plate 527 and the pins 569 can be removed from the openings 573 in the plate 527. By using the pins 569 and magnets 571, the wheel assembly 561 can be easily attached and detached from the pumping system 521, making the pumping system 521 easier to use and store.

Although the safety closures described above have been discussed in the context of portable pumping systems, in other embodiments, the safety closures disclosed herein are not limited to such use and may be used for many different applications (e.g. pump guns, injection guns, motorized pumping systems, etc.), if desired, without limitation. Thus, such safety closures are not limited for use with portable pumping systems and may be used with various systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A safety closure having a longitudinal axis, the safety closure comprising:
   an adaptor arranged to be attached to a cartridge or product barrel of a pumping system, said adaptor defining an axial bore and an outer radial surface, said outer radial surface defining a first plurality of radial ridges and a plurality of gaps extending in an axial direction between groupings of said first plurality of radial ridges, each of said first plurality of radial ridges extends generally perpendicular to the longitudinal axis and comprises a first end and an opposing second end, and adjacent first radial ridges within a grouping of said plurality of radial ridges are separated by a space;
   a cap including an inner radial surface defining a receiving space and a second plurality of radial ridges, said receiving space arranged to receive an upper portion of said adaptor and said second plurality of radial ridges arranged to selectively mate with and engage said first plurality of radial ridges of said adaptor to secure said cap on said adaptor, each of said second plurality of radial ridges extends generally perpendicular to said longitudinal axis and comprises a first end and an opposing second end, and adjacent second radial ridges of said plurality of radial ridges are separated by a space;
   at least one stopping structure located within said space between adjacent first radial ridges or within said space between adjacent second radial ridges and adjacent the first ends of said adjacent first radial ridges or said adjacent second radial ridges, the at least one stopping structure being configured to limit relative rotation between said cap and said adaptor in a first direction; and a locking system comprising a locking arm pivotally attached to an outer peripheral surface of said cap and including a lock piece arranged to selectively protrude into said receiving space of said cap to lock said first plurality of radial ridges in engagement with said second plurality of radial ridges, said lock piece being configured to engage said second end of at least one of said first plurality of radial ridges to limit relative rotation between said cap and said adaptor in a second direction opposite said first direction, said locking arm being pivotally attached to said outer peripheral surface of said cap that such said locking arm pivots about a pivot axis that is generally parallel to said longitudinal axis of said safety closure.

2. The safety closure of claim 1, wherein a bottom of said cap defines at least one notch in communication with said receiving space of said cap, said notch arranged to selectively receive said lock piece of said locking arm.

3. The safety closure of claim 1, wherein said cap is movable between a disengaged position, wherein said second plurality of radial ridges of said cap are substantially aligned within the plurality of gaps defined on said outer radial surface of said adaptor, and an engaged position, wherein said second plurality of radial ridges of said cap are positioned between and engaged with said first plurality of radial ridges of said adaptor.

4. The safety closure of claim 3, wherein said locking arm is configured to pivot about a pivot point on the outer peripheral surface of the cap between an unlocked position, wherein said lock piece clears said first radial ridges of said adaptor, and a locked position, wherein said lock piece protrudes into said receiving space of said cap and engages at least one of said first radial ridges.

5. The safety closure of claim 4, further comprising a spring or resilient member configured to bias said locking arm into said locked position.

6. The safety closure of claim 4, wherein said lock piece further engages at least one of said second radial ridges to lock said cap on said adaptor when said cap is in said engaged position and said locking arm is in said locked position.

7. The safety closure of claim 4, wherein said lock piece prevents said cap from moving into said engaged position when said cap is in said disengaged position and said locking arm is in said locked position.

8. The safety closure of claim 1, wherein said locking arm has an arcuate shape substantially corresponding to a curvature of the outer peripheral surface of said cap.

9. The safety closure of claim 1, wherein the at least one stopping structure comprises one or more pins mounted within the the space between adjacent first radial ridges or within the space between adjacent second radial ridges.

10. The safety closure of claim 1, wherein said cap defines an annular groove within said receiving space.

11. The safety closure of claim 10, wherein said annular groove has a dovetail cross-sectional shape.

12. The safety closure of claim 10, wherein a sealing member is situated in said annular groove and arranged to form a seal between said cap and a top of said adaptor.

13. The system of claim 10, further comprising a wheel assembly removably attached to said pumping system via at least one magnet for easier transportation.

14. The safety closure of claim 1, wherein said outer radial surface of said adaptor defines an annular groove arranged to receive a sealing member, wherein said sealing member is arranged to form a seal between said adaptor and said cap.

15. The safety closure of claim 1, wherein said axial bore of said adaptor defines an annular groove arranged to receive a sealing member, wherein said sealing member is arranged to form a seal between said adaptor and the cartridge or product barrel.

16. The safety closure of claim 1, wherein at least one of said first radial ridges includes a leading edge having an angled configuration.

17. A safety closure having a longitudinal axis, the safety closure comprising:
    an adaptor arranged to be attached to a cartridge or product barrel of a pumping system, said adaptor defining an axial bore and an outer radial surface, said outer radial surface defining a first plurality of radial ridges and a plurality of gaps extending in an axial direction between groupings of said first plurality of radial ridges, each of said first plurality of radial ridges comprises a first end and an opposing second end;
    a cap including an inner radial surface defining a receiving space and a second plurality of radial ridges, said receiving space arranged to receive an upper portion of said adaptor, said cap movable between a disengaged position in which said second plurality of radial ridges are positioned within said gaps of said adaptor and an engaged positioned in which said second plurality of radial ridges selectively mate with and engage said first plurality of radial ridges of said adaptor to secure said cap on said adaptor, each of said second plurality of radial ridges comprises a first end and an opposing second end;
    at least one stopping structure located within a space between adjacent first radial ridges or within a space between adjacent second radial ridges and adjacent the first ends of said adjacent first radial ridges or said adjacent second radial ridges, the at least one stopping structure being configured to limit relative rotation between said cap and said adaptor in a first direction; and
    a locking system comprising a locking arm and a lock piece, said locking system movable between an unlocked position in which said lock piece is moved out of said receiving space and a locked position in which said lock piece protrudes into said receiving space and engages a second end of at least one of said first plurality of radial ridges to limit relative rotation between said cap and said adaptor in a second direction opposite said first direction, said locking arm being pivotally attached to an outer radial surface of said cap that such said locking arm pivots about a pivot axis that is generally parallel to said longitudinal axis of said safety closure.

18. The safety closure of claim 17, wherein at least one of said first radial ridges includes a leading edge having an angled configuration.

19. The safety closure of claim 17, wherein said locking system is biased toward said locked position by a biasing mechanism situated between said locking arm and said cap member.

20. A pumping system comprising:
    a base;
    a pumping assembly positioned on said base;
    a pump actuator operatively coupled to said pumping assembly;
    a product barrel adapted for holding product operatively coupled to said pumping assembly, said product barrel including a male threaded portion; and a safety closure having a longitudinal axis and including:
an adaptor arranged to be attached to a top of said product barrel, said adaptor defining an axial bore and an outer radial surface, said outer radial surface defining a first plurality of radial ridges and a plurality of gaps extending in an axial direction between groupings of said first plurality of radial ridges, each of the plurality of first radial ridges comprises a first end and an opposing second end;
a cap including an inner radial surface defining a receiving space and a second plurality of radial ridges, said receiving space arranged to receive an upper portion of said adaptor and said second plurality of radial ridges arranged to selectively mate with and engage said first plurality of radial ridges of said adaptor to secure said cap on said adaptor, each of the plurality of second radial ridges comprises a first end and an opposing second end;
at least one stopping structure located within a space between adjacent first radial ridges or within a space between adjacent second radial ridges and adjacent the first ends of said adjacent first radial ridges or said adjacent second radial ridges, the at least one stopping structure being configured to limit relative rotation between the cap and the adaptor in a first direction; and
a locking system comprising a locking arm pivotally attached to an outer radial surface of said cap and including a lock piece arranged to selectively protrude into said receiving space of said cap to lock said first plurality of radial ridges in engagement with said second plurality of radial ridges, said lock piece being configured to engage said second end of at least one of said first plurality of radial ridges to limit relative rotation between said cap and said adaptor in a second direction opposite said first direction, and said locking arm being pivotally attached to said outer radial surface of said cap that such said locking arm pivots about a pivot axis that is generally parallel to said longitudinal axis of said safety closure.

* * * * *